United States Patent [19]

Unnerstall

[11] 4,347,546

[45] Aug. 31, 1982

[54] LOGIC CIRCUIT FOR PART DETECTOR

[76] Inventor: Paul J. Unnerstall, 6319 Mackenzie Ct., St. Louis, Mo. 63123

[21] Appl. No.: 180,998

[22] Filed: Aug. 25, 1980

[51] Int. Cl.³ .............................................. H02H 5/00

[52] U.S. Cl. ........................................ 361/179; 29/707

[58] Field of Search .................... 361/179, 1, 139, 160, 361/166, 180; 29/707

[56] References Cited

U.S. PATENT DOCUMENTS 4,140,072 2/1979 Bartling et al. ................. 361/179 X

*Primary Examiner*—Harry E. Moose, Jr.
*Attorney, Agent, or Firm*—Jerome A. Gross

[57] ABSTRACT

Inspection apparatus is especially useful to verify the presence of metal parts such as pull tabs on can-production lines and to shut down lines not only if parts are missing or misplaced, but also if the sensors are shorted or the timer switch or circuit operation has otherwise been disturbed. Four stages of operation are coordinated with the mechanical progress of the machine, regardless of its speed of operation; these stages are the activating and deactivating of sensors (usually just before and just after a mechanical operation), then on switching a timing switch to low, and then on switching it back to high just before the sensors are again activated. At and after the stage of deactivation, the sensors are read for actual lack of signals, and latches of their signals during activation are also read to determine whether the parts were actually sensed. The signal to read is turned off when the timing switch goes high. Any concurrence of a read signal with a lack of latching or with the presence of a sensor signal indicates some problem of parts condition or of the circuit or timing switch; therefore on such concurrence the machine shuts down immediately.

2 Claims, 4 Drawing Figures

LOGIC CIRCUIT FOR PART DETECTOR

BACKGROUND OF THE INVENTION

The present invention relates to circuitry for sensing the presence or absence of parts along an assembly line in order to halt the progression of the assembly line if an abnormal condition occurs.

In assembly line manufacture of many items, part detectors have been utilized to determine whether certain parts have been properly made or installed. For example, in the manufacture of the tops for tab-top beverage containers on a transfer press or other production line, part-detecting mechanisms have been employed to detect whether the tab pull is in place. Sensors, such as grounding probes, descend to detect the presence or absence of the tab pull when the line is momentarily at rest, such as during a stamping step at a preceding station. It is critically important to detect whether the production is proceeding normally not only for quality control, but to assure there is no loose tab in the press which might damage dies or other expensive tooling.

Prior art control circuitry, which accepts inputs from the sensors, halts the transfer press if a probe fails to detect a part. Some controllers, such as the IC Series Malfunction Detectors made by Tyco Wintriss Controls, Garden City Park, New York 11040, may halt operation also after a sensor malfunctions for a continued period of time; but to the best of Applicant's information such shut down depends on time lapse and is not keyed directly to the stages of operation of the machine.

SUMMARY OF THE INVENTION

An object of the present invention is to provide inspection apparatus coordinated directly with the progression of a production line at the stages when sensors are activated, and then when deactivated, (for example, when probes descend and then ascend) and also when a timer switch is switched to low after the cessation of some production operation during the time the sensors are activated and then when the timer switch is switched back to high preparatory to the next operation. The inspection apparatus provides a part detector logic circuit normally having two or more sensor inputs which not only sense the presence or absence of parts, but also serve to check for shoring of the sensors by loose parts and for timing switch malfunctions. Another object is to provide such inspection apparatus which will operate without adjustment for speed of the production line, but only coordinated to its progress, and will shut down the line instantly on detecting an abnormal parts or circuit condition.

Briefly summarized, the present inspection apparatus utilizes, at a selected station along a manufacturing line, a plurality of conventional sensors, such as probes, which are activated as by extension to sense for the plurality of parts and are deactivated as by retraction. If such deactivation terminates all indication of sensing, a logic circuit is triggered to read latched indications of the sensing probe inputs, and simultaneously reads the sensors for any new indication of sensing (for example, if a part has come loose to short a sensor). Should there be no termination of indication of sensing to trigger the reading, a read signal is thereafter triggered by the change of state of the timing switch. It is basic to the operation of the present logic circuit that any concurrence of a read signal with either a failure to latch or the presence of a sensor signal shuts the machine down.

DESCRIPTION OF THE PREFERRED EMBODIMENT

Figure 1:
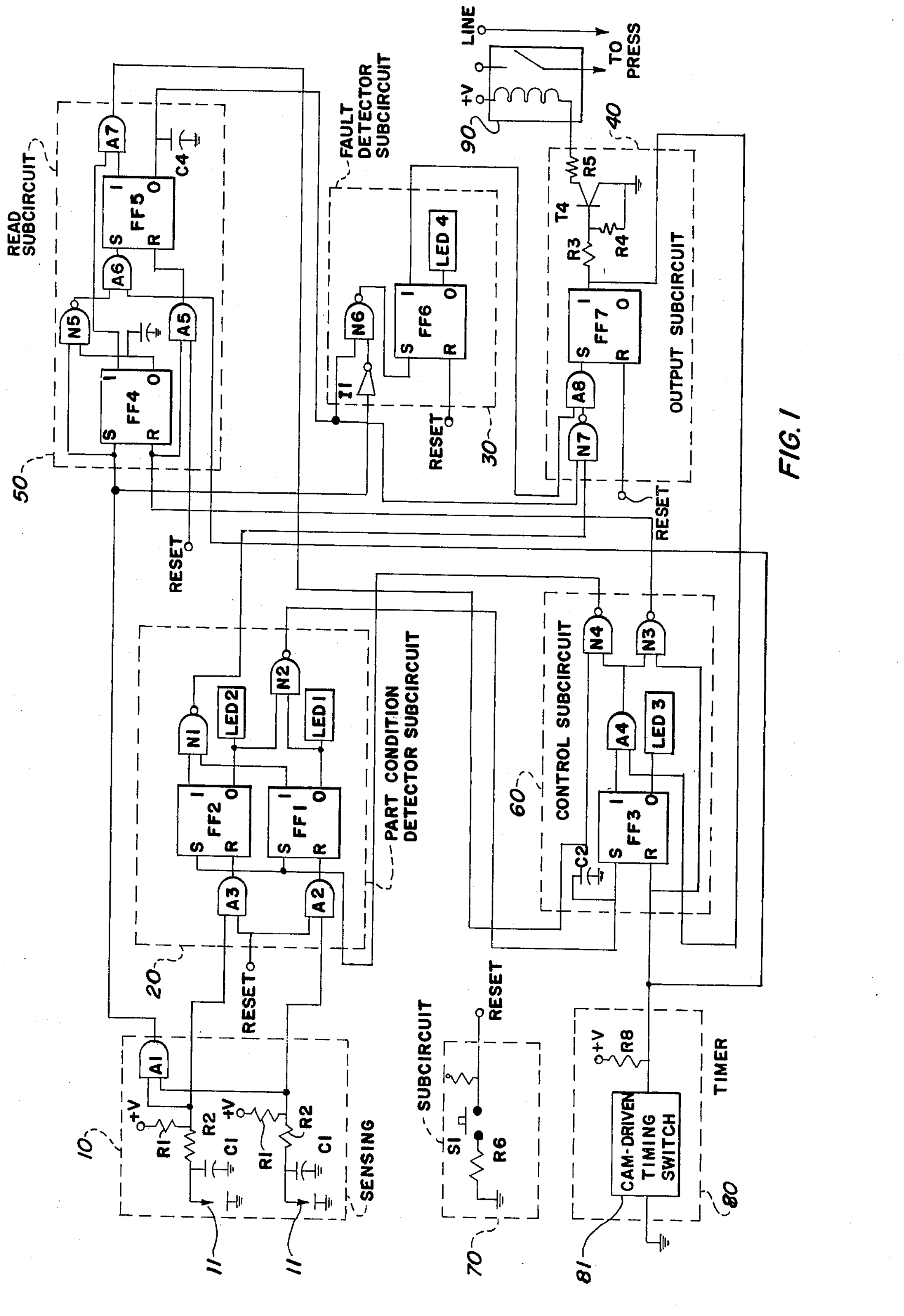
FIG. 1 is a detailed schematic of a circuit embodying the present invention, with its various subcircuits indicated by dashed lines.

The preferred embodiment of the present invention, whose circuit diagram is shown in FIG. 1, is adapted for use at a selected station along a transfer press line which assembles pull tabs on cans. The circuitry is adapted to utilize conventional sensing probes as part sensors, here completing a ground connection on sensing a part; if no part is detected there should be no grounding. A conventional cam-driven timing switch, described below, switches the circuit to high just prior to lowering (or otherwise activating) the probes for sensing, and then back to low after the sensors are deactivated, just prior to resumption of movement of the production line. Typically the inspection operation takes place during a period when at a prior station a forming operation is taking place. During the interval for which the timing switch produces its high output, the sensors lower, detect parts to produce sensing signals if they are properly in place, and raise to terminate these signals assuming the probes are not inadvertently grounded. However, as each signal is produced, it is latched. Thereafter when a reading takes place, the presence of latching is compared with the absence of sensor signals, as one criterion of normal functioning.

Figure 2:
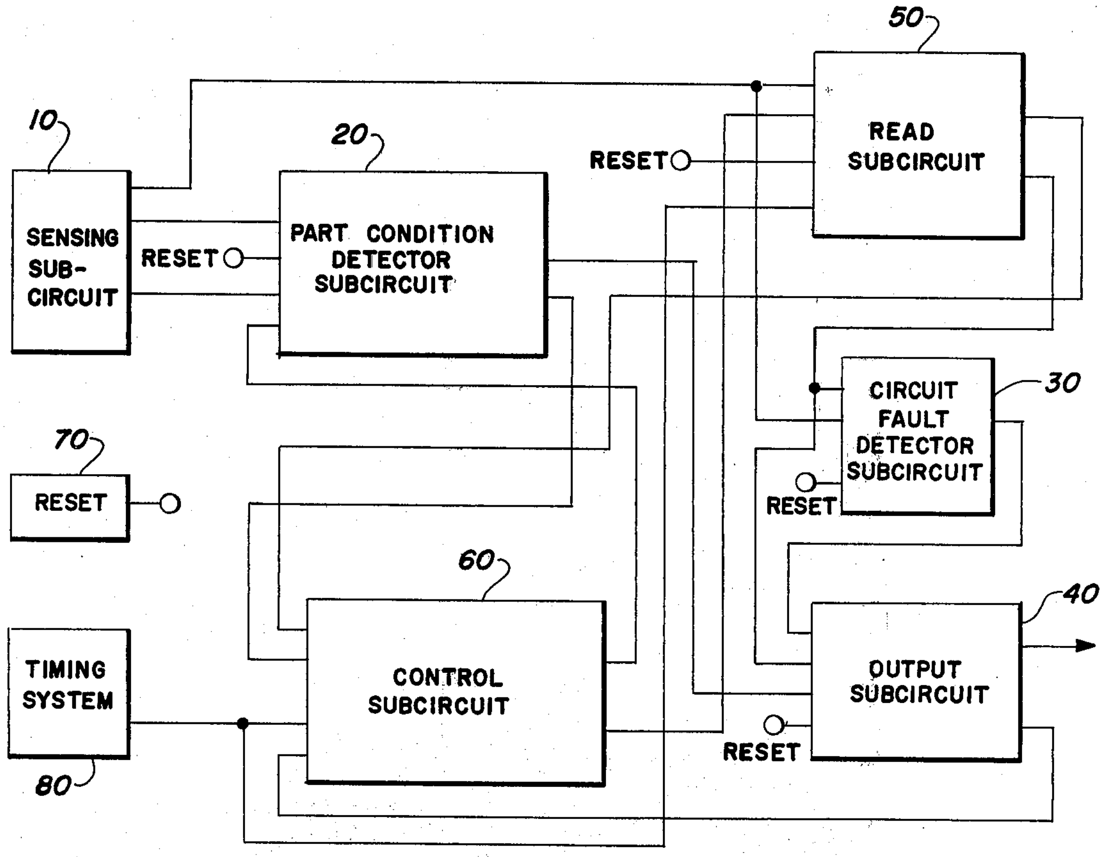
FIG. 2 is a block diagram showing the interconnection of the subcircuits shown in FIG. 1.

The logic circuit illustrated includes control circuitry for start-up of the transfer press by driving a relay 90. This logic circuit may be considered as composed of several subcircuits, each performing functions interrelated with the timing switch and sensing probes. Referring to FIG. 2, a sensing subcircuit 10 determines the presence or absence of parts. A part condition detector subcircuit 20 detects and signals the absence of a part and, where the circuitry is used to check two cans simultaneously, indicates by light-emitting-diode outputs, from which the part is absent. A circuit-fault detector subcircuit 30 checks for grounded probes and timer failures. An output subcircuit 40 reads the part condition detector 20 and circuit-fault detector 30 and shuts down the transfer press when a missing part or a circuit-fault is detected. A read subcircuit 50 indicates to the output subcircuit 40 when to read the part condition detector subcircuit 20 and indicates to the circuit-fault detector subcircuit 30 when the check for faults. A control subcircuit 60 resets circuitry on each new sensing cycle. A reset circuit 70 is utilized on startup to enable the control subcircuit 60, reset the part condition detector subcircuit 20, and latch on the output circuit 40 to restart the transfer press.

Describing each subcircuit in detail, as shown in FIG. 1, the sensing subcircuit 10 includes a pair of conventional sensing probes 11 which provide a ground connection when they descend and contact a part. Each probe is tied to a d.c. voltage source +V by the series combination of a pull-up resistor R1 and a limiting resistor R2, whose common terminal forms the probe output line of the sensing circuit 10 for each probe 11. A damping capacitor C1 is provided in parallel with the probe 11. The output of a two-input AND gate A1, whose two inputs are coupled from the two probe output lines, forms a common output of the sensing subcircuit 10. To avoid noise problems, a conventional optical coupler or isolator, not shown, may be provided in the sensing lines.

Figure 3:
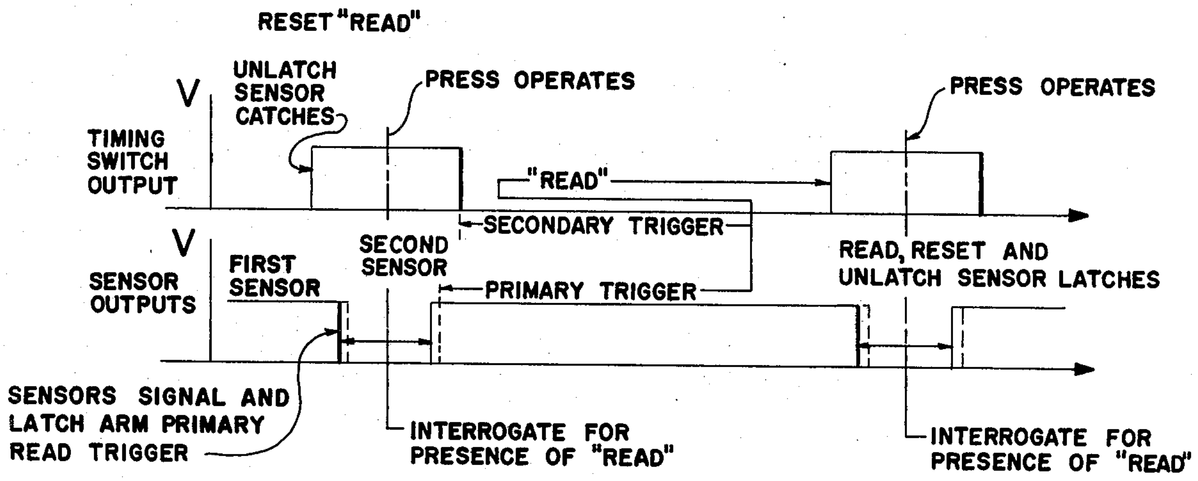
FIG. 3 graphically compares the sequence of outputs, under normal operation of the timing switch and sensing probes.

The timing system 80 utilizes a conventional cam-driven timing switch 81, shown generally in block diagram form, which is grounded at one side of its contacts; a pullup resistor R8 to a high logic supply +V is coupled to the other side of its contacts. The timing switch 81 and the sensors 11 are sequenced, preferably mechanically so that the switch 81 switches to high before some operation on the production line (for example, when it stops for an operation); then the sensors 11 are activated as by descending; then they are deactivated and/or lift; and then the timing switch switches to low when activated; each probe produces a low output if it detects a part, as shown in FIG. 3. The timing switch 81 closes and the timing line goes low after the probes 11 have lifted. Again, the timing line may be provided with a conventional optical coupler or isolator, not which, to reduce noise injected into the logic circuit.

The part condition detector subcircuit 20 receives the two probe outputs from the sensing subcircuit 10, one of the probe outputs being connected to one input of a two-input AND gate A2, whose output is connected to the R input of a conventional set/reset flip-flop FF1. The other probe output is similarly connected to one input of a two-input AND gate A3, whose output is connected to the R input of a second set/reset flip-flop FF2. The second inputs of the two AND gates A2, A3 are connected to a reset line, normally held high. The S inputs of the two flip-flops FF1, FF2 are coupled together to form another input of the part condition detector subcircuit 20, from the control subcircuit 60. The "1" outputs of the two flip-flops FF1, FF2 are connected to the two inputs of a two-input NAND gate N1, (later referred to as second logic gate means), while their "0" outputs are connected to the two inputs of another two-input NAND gate N2, whose output forms an output of the part condition detector subcircuit 20 coupled to the control subcircuit. 60. The "0" output of flip-flop FF1 drives a light-emitting-diode display lamp LED1, and the "0" output of FF2 drives another light-emitting-diode display lamp LED2. These displays LED1, LED2, shown in block form, may include an LED driver.

To avoid confusion, the truth table for all of the flip-flops utilized in the logic circuit is set forth below:

| S Input | R Input | "1" Output | "0" Output | |
|---|---|---|---|---|
| 1 | 0 | 1 | 0 | (set) |
| 0 | 1 | 0 | 1 | (reset) |
| 1 | 1 | Unchanged | | |
| 0 | 0 | Indeterminate | | |

The control subcircuit 60 includes a set/reset flip-flop FF3 whose R input is coupled from the timer 80 and whose S input is coupled from the output of NAND gate N2 of the part condition detector subcircuit 20. A delay capacitor C2 couples the S input to ground. The "0" output of FF3 drives a light-emitting-diode display LED3, while its "1" output drives one input of a two-input AND gate A4, whose second input is driven by the output subcircuit 40. The control subcircuit 60 has a two-input NAND gate N3 having one input driven by the timer and a second intput driven by the AND gate A4, the output of N3 being coupled to the read subcircuit 50. A second two-input NAND gate N4 in the control subcircuit 60 has one input coupled from AND gate A4 and a second input driven by the read subcircuit 50; the output of NAND gate N4 drives the set inputs of the two flip-flops FF1, FF2 of the part condition detector subcircuit 20.

The read subcircuit 50 includes a pair of set/reset flip-flops FF4 and FF5, FF4 having its R input coupled from the output of NAND gate N3 of the control subcircuit 60 and FF5 having its R input receiving the output of a two-input AND gate A5, which has one input utilized as a reset, normally held high, and the other input likewise coupled from NAND gate N3 of the control subcircuit 60. Flip-flop FF4 has its S input coupled from AND gate A1 of the sensing subcircuit 10; its "0" output drives one input of a two-input NAND gate N5, whose other input is also coupled from AND gate A1. The S input of the second flip-flop FF5 is driven by a two-input AND gate A6 having one input coupled from the output of NAND gate N5 and its other input coupled from the timer 80. The "0" output of FF5 drives the fault detector and output subcircuits 30, 40, while its "1" output is coupled to one input of a two-input AND gate A7, whose other input is coupled from the "1" output of FF4. The output of A7 drives the control sub-circuit 60. Each of the flip-flops FF4 and FF5 have damping capacitors C3, C4 from their "0" outputs to ground.

The circuit fault detector subcircuit 30 includes an inverter I1 driven by AND gate A1 of the sensing subcircuit 10, the inverter I1 driving one input of a two-input NAND gate N6, whose other input is coupled from the "0" output of FF5 of the read subcircuit 50. NAND gate N6 drives the S input of a flip-flop FF6, whose R input is connected to the reset line, normally held high. The "0" output of FF6 drives a light-emitting-diode display LED4, while its "1" output drives the output subcircuit 40.

The output subcircuit 40 includes a two-input NAND gate N7 whose inputs are coupled from NAND gate N1 of the part condition detector subcircuit 20 and from the "0" output of FF5 of the read subcircuit 50. NAND gate N7 drives one input of a two-input AND gate A8, having its other input coupled from the "1" output of FF6 of the fault detector subcircuit 30. AND gate A8 drives the S input of a flip-flop FF7, whose R input is coupled to the normally high reset line. The "1" output of FF7 drives an input of AND gate A4 of the control subcircuit 60, and also drives the base of an emitter-grounded npn transistor T1 through a first bias resistor R3; the base is coupled to ground by a second bias resistor R4 and the collector is coupled by an output resistor R5 to the coil of the relay 90 and is supplied by a d.c. voltage +V. When transistor T1 is conducting, the relay contacts are closed, supplying a.c. power to the transfer press.

The reset subcircuit 70 includes a normally open momentary-contact switch S1 having one side of its contacts ground through a resistor R6, while its other side, which forms the reset line, is coupled to a high digital voltage supply +V by a pullup resistor R7. The reset line is normally high, but when the switch S1 is closed, the line goes low.

Circuit Operation

The operation of the logic circuit shown in FIG. 1 is coordinated by the inputs from the sensing probes 11 and cam-driven timing switch 81. As indicated in the sequence graphs, FIG. 3, the initiation of the sensing cycle may be considered to begin with the stage of providing a high timing switch output which prepares the circuitry for sensing by resetting (that is, canceling) the previously triggered read signal and opening the sensor latches. At the following stage, when each sensing probe 11 extends, the circuitry is interrogated for continuance of a read signal (which continuance will shut the machine down); and the probes' sensing of parts will then be signaled and also latched in the part condition detector 20. This sensing operation by descent of the probes is timed just prior to some press operation. At the next stage, on retraction of the sensing probes, complete termination of sensing of parts (after at least one of them initially sensed a part) triggers a primary read signal which causes the latched part condition detector 20 to be read for an indication of any absence of a part (that is, any absence of latching); simultaneously the then present condition of the part sensors is read to detect a circuit-fault condition in the sensors, for example, if any sensing signal has recommenced, as would occur if a sensor then became shorted. If either of these conditions occur, the transfer press is halted. Assuming it proceeds however, at the next stage when the timing switch output of line goes low, a secondary read trigger again triggers the read signal, causing a re-reading of both the latches of the part condition detector and the state of the sensors. Thus, if there was no primary read trigger (either because of lack of sensing of any part whatsoever or because of the continued shorting of a probe commencing prior to its deactivation) a reading at this stage showing lack of latching or continued sensing will halt the machine. Finally as the cycle repeats, change in the timing switch output again resets the read signal and unlatches the sensor latches, while the circuit is then interrogated for the presence of a read signal, which will halt the machine, as will any apparent continuation of latching.

Figure 4:
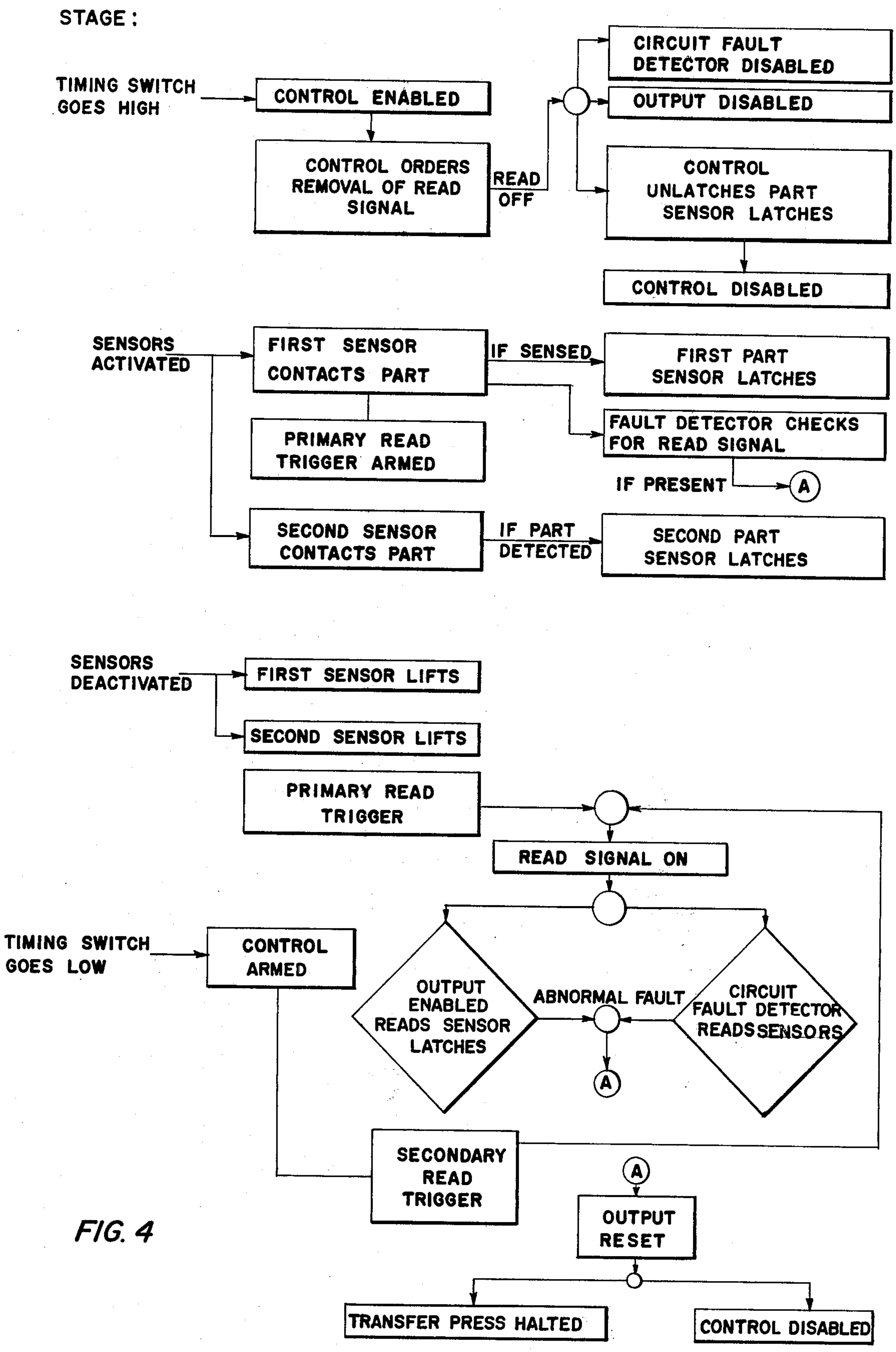
FIG. 4 is a flow chart indicating the operation of the circuit of FIG. 1.

Describing the circuit operation in detail and referring to the flow chart of FIG. 4 and circuit schematics of FIGS. 1 and 2, the sensing cycle may be considered to begin with opening of the contacts of the timing switch 80, which causes the timer output line to go to a high logic level, later referred to as a selected logic level.

The high timer output enables the control subcircuit 60, causing the output of NAND gate N3 to go low. This enabling of the control circuit 60 causes flip-flop FF4 to set, assuming both sensors 11 are functioning properly, so that AND gate A1 is high. The high timer input to AND gate A6, the high input from A1, the low output of N3, and the setting of FF4, cause flip-flop FF5 to set. This results in removal of the read signal on the outputs of FF5; the initiation of the read signal will be described below. NAND gate N6 and N7 of the fault detector and output subcircuits 30, 40 are disabled by the low output from FF5.

The control subcircuit 60 monitors the read signal, and on confirmation of its cessation, NAND gate N4 goes low, permitting flip-flops FF1 and FF2 of the part condition detector subcircuit 20 to reset. NAND gate N1 is then high and NAND gate N2 is low. N2 is monitored by the control subcircuit 60 to confirm that the part condition detector flip-flops FF1, FF2 have been reset; as N2 goes low, FF3 is reset, lighting LED3 and disabling N3 and N4, which form the outputs of the control subcircuit 60. The circuit is now prepared to sense for the parts.

Driven by the transfer press, the sensing probes now extend, descending substantially simultaneously to contact the parts, if present. Because of the great speed of the logic, the probes 11 may appear to contact the parts at lightly different times, as illustrated in FIG. 3. When the first of these sensors 11 contacts a part, its output goes low providing a probe signal, the corresponding part condition detector flip-flop FF1 or FF2 is set, and AND gate A1 goes low, resetting FF4 of the read subcircuit, which may be referred to as "arming" the primary read trigger. The low output of A1 enables NAND gate N6 of the fault detector 30, which then monitors for a read signal. If a read signal is present at this time, FF6 is reset, causing AND gate A8 on the put of flip-flop FF7 of the output subcircuit 40 to go low, resetting FF7, which may be later referred to as a warning signal. This warning signal is, in this embodiment, utilized to turn off transistor T1 and thus the transfer press via relay 90, and disable the control 60 through its AND gate A4.

As the second sensing probe 11 contacts a part, its output produces a probe signal and the other part condition detector flip-flop FF1, FF2 is set. If either of the probes 11 should fail to indicate sensing of a part, due to absence of misplacement of the part, an open connection to the probe, or failure of a probe to descend properly, no low probe output (probe signal) will be given, the corresponding flip-flop FF1, FF2 will remain reset and the output of NAND gate N1 will be high, indicating an abnormal part condition. The light-emitting-diode display LED1 or LED2 corresponding to the reset flip-flop FF1 or FF2 will be lighted.

As operation continues, the probes 11 retract, ascending to break contact with the part. Again, one probe 11 may slightly precede the other. As the second probe 11 breaks contact, A1 goes high. This causes the read subcircuit 50 to internally generate a primary read trigger signal by NAND gate N5 going low. This signal normally causes A6 to go low and thus FF5 to reset, commencing the read signal, with the "0" output of FF5 going high.

Commencement of the read signal causes the fault detector 30 to read the sensor inputs via AND gate A1. If either probe is low, thus providing a probe signal, such as due to a short, FF6 is reset, relaying the indication of a probe malfunction to the output circuits and indicating the condition by lighting LED4.

The read signal causes the output subcircuit 40 to read body N1 of the part condition detector 20 and FF6 of the circuit-fault detector 30. If a fault is relayed, A8 goes low, or if N1 is high, indicating a missing part or open probe, N7 goes low, driving A8 low. In either case, if A8 goes low, FF7 is reset, turning off transistor T1 and the transfer press, and the control 60 is disabled by its AND gate A4.

If no abnormal part or probe condition has occurred to cause the transfer press to be halted on the primary read stage, the logic circuit is again triggered on the termination of the high timer output. This is necessary because a failure to attain a primary read may be caused by one of the probes failing to return to a high output after sensing, or the lack of sensing of a part by either probe. When the timer 80 goes a seconary rear trigger signal is supplied to the read subcircuit; if A6 is not already low, it becomes low, resetting FF5 and generating the read signal, which causes another reading of the part condition and circuit-fault detectors 20, 30, as described above.

When the timing switch goes low, the control 60 is armed, since FF3 is set. When it again goes high, another sensing cycle begins, as previously described.

If the transfer press is halted, the reset switch S1 is pressed when start-up is desired. The resulting low output of the reset line sets the part condition detector flip-flops FF1, FF2, read subcircuit flip-flop FF5, fault detector flip-flop FF6, and the output circuit flip-flop FF7, which turns on transistor T1 and allows the transfer press to be started.

The advantages of the present invention lie in part in the detection of both circuit faults (as when a part sensor continues to signal after all sensor signals sould be terminated), and timing switch faults, by confirming the cessation of a read signal prior to unlatching the parts signals. Another advantage is that the circuitry functions according to the speed of the manufacturing line, with no circuit adjustments required when the speed of the line is changed.

Modifications of the circuitry will be apparent to persons skilled in the art. The logic components in the individual subcircuits may have other design aspects without departing from their function, as described above. For example, the part condition detector might be modified by providing a NAND gate which receives the sensors outputs and drives a single latch, whose output indicates whether a part is missing. The logic circuit may be utilized with other types of probes such as proximity sensors; activated and deactivated in a suitable manner. Furthermore, the system may be used in inspection of other types of production lines, such as those which start and stop intermittently; in this case changes in condition of the timer switch would be coordinated with or relative to stopping and starting of the line. From these examples, other modifications will suggest themselves.

I claim:

1. For use with that type of machine transferring a succession of items and characterized by having dwell periods, during which such items are inspected for the presence or position of a part, alternating with periods of transfer movement, and utilizing an electrical part sensor whose normal actuation and deactuation occur during such dwell period, inspection circuitry comprising timing switch means having a first and second condition and changing therebetween in response to the progress of the machine, the second switch condition being associated with machine transfer movement and the first condition being associated with machine dwell, in combination with (a) means, effective on the switching of said switch means from said second condition to said first condition, for canceling both a prior read signal and the prior latching of such part sensor, (b) means, effective thereafter on normal actuation of such part sensor, to check for the continued presence of such prior read signal and if present, to halt the machine, and also to signal the sensing by such part sensor of the presence of such part, and to latch any sensor signal thereof, (c) means, effective on deactuation of such part sensor after initial sensing, to normally terminate its sensing signal, to furnish a read signal, and to read the condition of such latching and halt the machine in the event of a condition of non-latching, together with (d) means, effective on switching from said first timing switch condition to said second timing switch condition, to furnish a read signal and again to read the condition of such latching and of the then condition of sensing by the part sensor, and to halt the machine in the event either of a condition of non-latching or the then presence of a sensor signal, said read signal to be normally deactuated thereafter on switching from said second timing switch condition to said first condition as set forth in (a) hereinabove, whereby halting of the machine in any of the events mentioned in paragraphs (b), (c) and (d) above will occur during the machine dwell period in the event of failure of the timing switch or the abnormal presence of a sensor signal, as well as in the event of failure to latch.

2. For use with that type of machine transferring a succession of items and characterized by having dwell periods, during which such items are inspected for the presence or position of a part, alternating with periods of transfer movement, and utilizing a plurality of electrical part sensors whose normal actuation occur during such dwell period, inspection circuitry comprising timing switch means having a first and a second condition and changing therebetween in response to the progress of the machine, the second switch condition being associated with machine transfer movement and the first condition being associated with machine dwell, in combination with (a) means, effective on the switching of said switch means from said second condition to said first condition, for canceling both a prior read signal and the prior latching of such part sensors, (b) means, effective thereafter on normal actuation of such part sensors, to check for the continued presence of such prior read signal and if present, to halt the machine, and also to signal the sensing by such part sensors of the presence of such parts, and to latch any sensor signals thereof, (c) means, effective on deactuation of such part sensors after initial sensing by at least one of them, to normally terminate their sensing signals, to furnish a read signal, and to read both the condition of such latching and the then condition of sensing by the sensors, and to halt the machine in the event either of a condition of non-latching or the then abnormal presence of a sensor signal, together with (d) means, effective on switching from said first timing switch condition to said second timng switch condition, to furnish a read signal and again to read the condition of such latching and of the then condition of sensing by the part sensors, and to halt the machine in the event either of a condition of non-latching or the then presence of a sensor signal, said read signal to be normally deactuated thereafter on switching from said second timing switch condition to said first condition as set forth in (a) hereinabove, whereby halting of the machine in any of the events mentioned in paragraphs (b), (c) and (d) above will occur during the machine dwell period in the event of failure of the timing switch or the abnormal presence of a sensor signal, as well as in the event of failure to latch.

* * * * *

UNITED STATES PATENT AND TRADEMARK OFFICE
CERTIFICATE OF CORRECTION

PATENT NO. : 4,347,546

DATED : August 31, 1982

INVENTOR(S) : Paul J. Unnerstall

It is certified that error appears in the above—identified patent and that said Letters Patent is hereby corrected as shown below:

In column 1, line 48, delete "shoring" and insert ---shorting---.

In column 2, line 59, delete "the" and insert ---to---.

In column 4, line 6, delete "intput" and insert ---input---.

In column 4, line 67, delete "ground" and insert ---grounded---.

In column 6, line 13, delete "lightly" and insert ---slightly---.

In column 6, line 22, delete "put" and insert ---input---.

In column 6, line 33, after "absence", delete "of" and insert ---or---.

In column 6, line 58, delete "body" and insert ---both---.

In column 7, line 3, delete "rear" and insert ---read---.

In column 7, line 19, delete "sould" and insert ---should---.

In column 8, line 53, delete "timng" and insert ---timing---.

Signed and Sealed this

*Twenty-sixth* Day of *October 1982*

[SEAL]

*Attest:*

GERALD J. MOSSINGHOFF

*Attesting Officer* *Commissioner of Patents and Trademarks*